April 7, 1942.   F. S. BARKS ET AL   2,279,156
REEL
Filed May 10, 1940   5 Sheets-Sheet 1

Frank S. Barks,
Lutwin C. Potter,
Victor G. Klein,
Inventors.
Haynes and Koenig
Attorneys April 7, 1942.　　　F. S. BARKS ET AL　　　2,279,156
REEL
Filed May 10, 1940　　　5 Sheets-Sheet 2
FIG. 3.
FIG. 8.
FIG. 4.
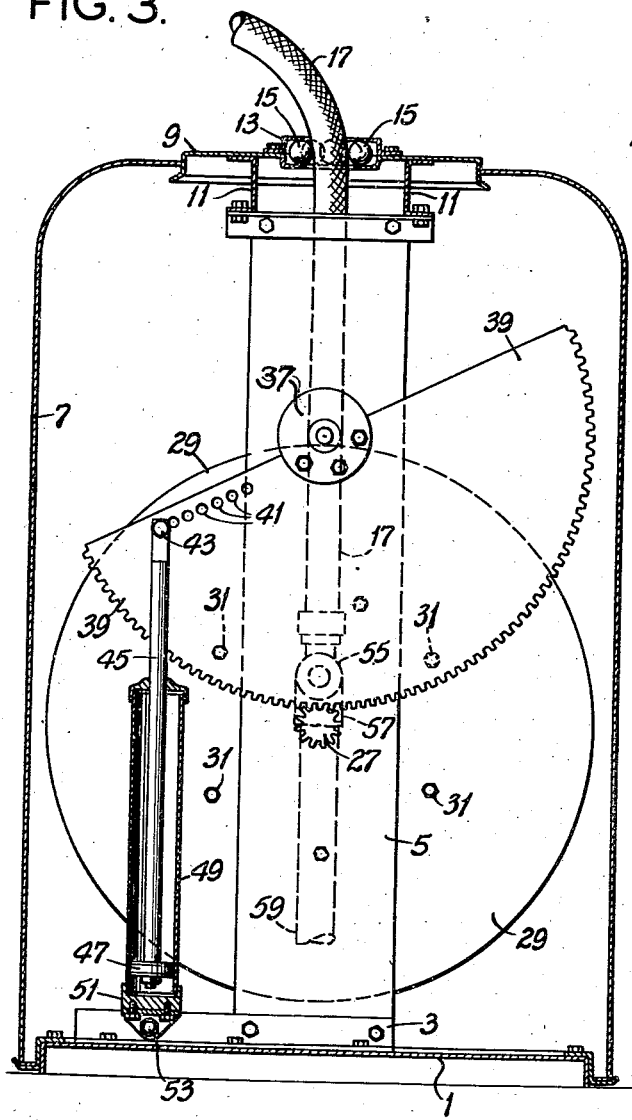
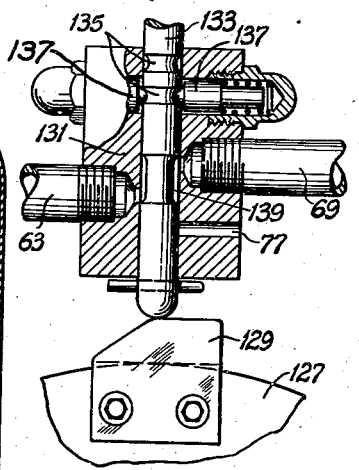
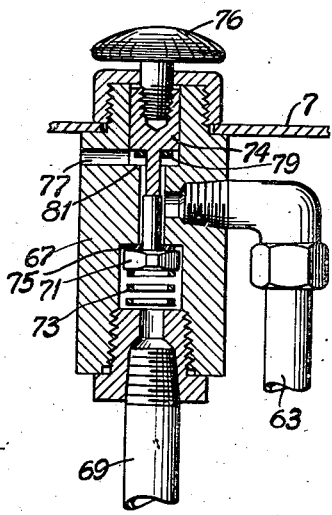
Frank S. Barks,
Letturie C. Potter,
Victor G. Klein,
Inventors
Haynes and Koenig
Attorneys.

April 7, 1942.  F. S. BARKS ET AL  2,279,156
REEL
Filed May 10, 1940  5 Sheets-Sheet 3

Frank S. Barks,
Lutwin C. Rotter,
Victor G. Klein,
Inventors.
Haynes and Koenig
Attorneys.

April 7, 1942.  F. S. BARKS ET AL  2,279,156
REEL
Filed May 10, 1940   5 Sheets-Sheet 4
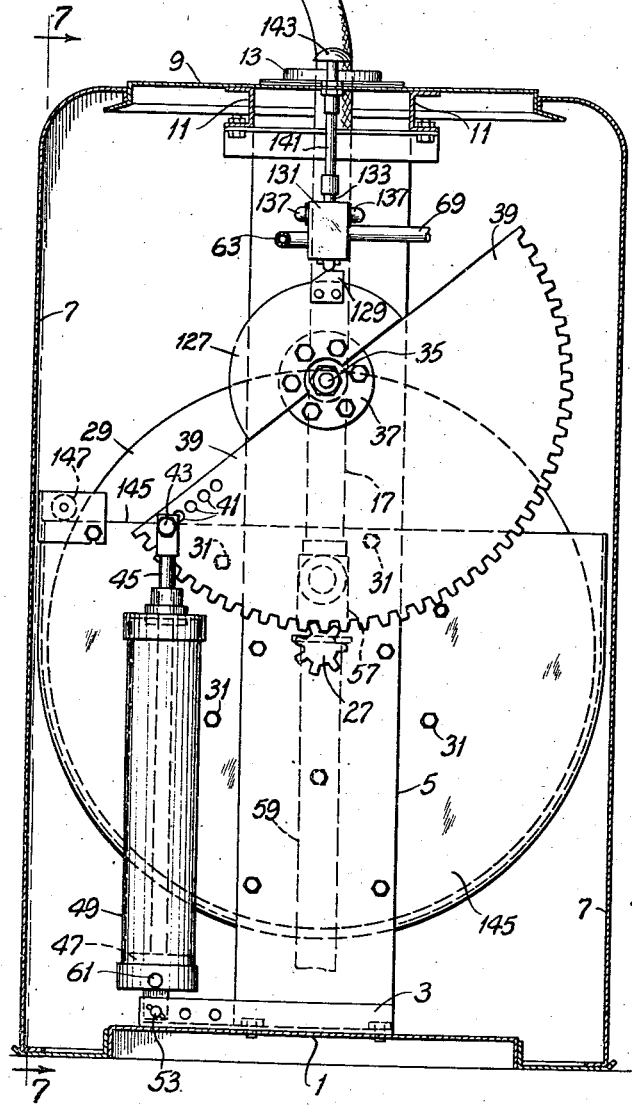
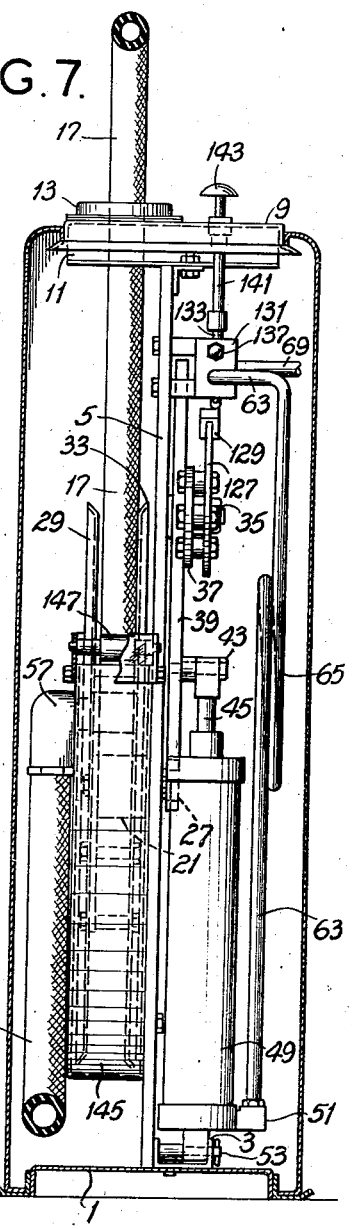
Frank S. Barks,
Lutwin C. Rotter,
Victor D. Klein,
Inventors.
Haynes and Koenig
Attorneys April 7, 1942. F. S. BARKS ET AL 2,279,156
REEL
Filed May 10, 1940 5 Sheets-Sheet 5

Frank S. Barks,
Lutwin C. Potter,
Victor G. Klein,
Inventors.
Haynes and Koenig
Attorneys.

Patented Apr. 7, 1942

2,279,156

UNITED STATES PATENT OFFICE 2,279,156

REEL

Frank S. Barks, St. Louis, Lutwin C. Rotter, Maplewood, and Victor G. Klein, St. Louis, Mo., assignors to Lincoln Engineering Company, St. Louis, Mo., a corporation of Missouri Application May 10, 1940, Serial No. 334,422

10 Claims. (Cl. 242—86)

This invention relates to reels and with regard to certain more specific features, to hose reels.

Among the several objects of the invention may be noted the provision of a hose reel which permits of freely unreeling and which may be set at will automatically to reel up the hose; the provision of a reel of the class described in which the reeling operation may be adapted to hoses of various flexibilities; the provision of a reel of this class in which the character of the reeling action may be adjustably controlled to different circumstances; and the provision of a reel of this class which is simple and compact in construction, requiring little head, and no pit space. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a vertical section of the apparatus, taken from front to rear, being taken on line 1—1 of Fig. 2;

Fig. 3 is a view similar to Fig. 1 showing an alternative position of parts;

Fig. 4 is an enlarged vertical section through a control valve;

Fig. 6 is a view similar to Fig. 3, showing another form of the invention;

Fig. 7 is a vertical section taken on line 7—7 of Fig. 6;

Fig. 8 is an enlarged vertical section of the form of valve used in the constructions of Figs. 6 and 7;

Similar reference characters indicate corresponding parts throughout the several views of the drawings.

One difficulty with the construction of hose reels heretofore has been that once a reel is designed for manufacture, it is difficult to adapt it to the various flexibilities of hose met with by the apparatus. For example, hose which carries high pressure lubricant is usually made with relatively heavy walls to withstand the pressure. Such hose is not so flexible, as for example is a light-walled, low-pressure hose or an air hose. Again, the same hose may at different times carry materials of different consistencies, such as for example, different consistencies of lubricant. Furthermore, different sizes of hose for the same material, for example different sizes of high-pressure lubricant hose, will have different flexibilities. All of these, and other variations, provide different conditions for reeling.

Figure 1:
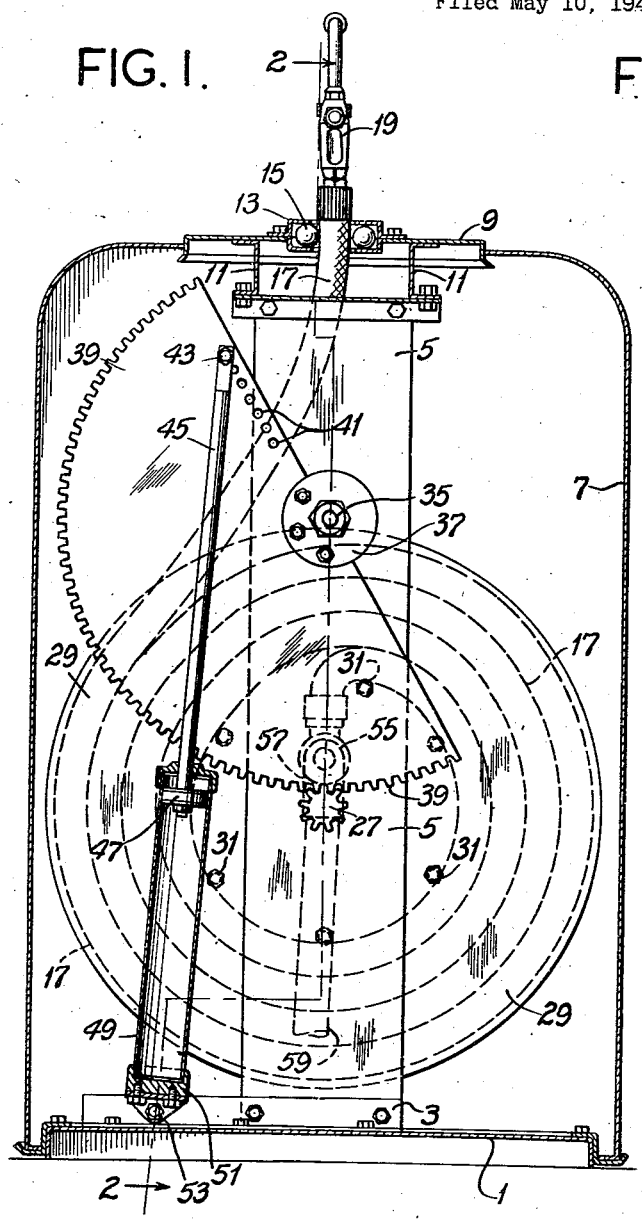
Figure 2:
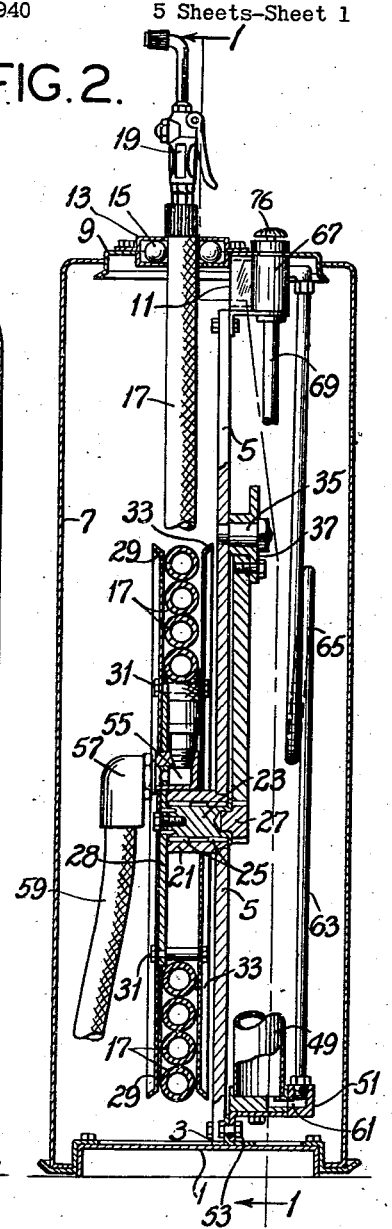
Fig. 2 is a cross section taken on line 2—2 of Fig. 1.

Referring now more particularly to Fig. 1, there is shown at numeral 1 a base on which is an angle iron 3 carrying a central vertical supporting plate 5. The base also supports an outer cover 7 in which is a head 9 supported upon the upper end of said central plate 5 by brackets 11. In the head 9 is a suitable guide member 13 including guide balls 15. The guide 13 and its appurtenances form the subject of a copending United States patent application of Victor G. Klein and Louis A. Reuter, Serial No. 340,946, filed June 17, 1940, for guide, and is specifically shown and claimed therein. Said copending application and the present one have a common assignee, Lincoln Engineering Company. The purpose of the guide 13 is to guide in and out the hose 17 which is to be reeled and to form a stop for the control nozzle 19 on the end of the hose when the hose is reeled up as shown in Fig. 1.

Fixed on the vertical plate 5 is a fixed cylindric bearing 21 in which a rotary journal 23 is supported upon bearings 25. On the right side of the plate 5 the journal 23 carries a pinion 27 and on the left side it carries a reel-supporting plate 29. The plate 29 in turn supports by means of studs 31 a reel plate 29. The studs 31 also form supporting pillars for a second reel plate 33.

The vertical plate 5 carries a second fixed stud 35 which forms a support for a rotary hub 37 of a 180° sector gear 39, the latter meshing with the pinion 27. Along one edge of the gear 39 is a radially arranged series of holes 41 in any one of which may be fastened a crank pin 43 of a connecting rod 45. At the end of the connecting rod 45 is a piston 47 which slides in a cylinder 49, the latter having an enclosing head 51 at its lower end pivoted to said angle iron 3 (see the pivot pin 53). Thus the sector gear 39 at the row of holes 41 forms a pinned, adjustable crank connection for the connecting rod 45. The gear 39, in connection with the rod 45, oscillating cylinder 49 and the framework forms a so-called oscillating slider crank linkage, speaking in kinematic terms.

The hose 17 is looped about the reel between plates 29 and 33, being supported upon the pillars 31. At its inner end it is connected with an angle nipple 55 which passes through the plates 28 and 29 where it is connected to a swivel end 57 of a supply hose 59. It will be noted that the swivel 57 is off center with respect to the stud 23 but this simply means that as the reel rotates, there is a revolving action of the center-line of the swivel connection 55, 57 (around the center line of the journal 23), as well as the rotary action between these parts 55 and 57. The flexibility in the hose 59 accommodates the revolving action.

The air inlet into the cylinder 49 is shown at the bottom at numeral 61, air being supplied over a supply line 63 which is made flexible at a loop 65. In the supply line 63 is a valve 67 (Fig. 4, for details) which receives air from a supply pipe 69. A valve head 71, which is compressed to its packed seat by spring 73, normally blocks flow from the supply 69 to the pipe 63. However, the head, along with the packing 75 may be lifted by pressure upon a plug 74 to which is fastened a control head 76. By pressing the head 76, the valve 71 may be opened, thus admitting air to the line 63 from line 69. In order that air shall then not pass to the exhaust 77, a packing 79 on head 74 is caused to seat at 81. However, when the valve 71 is seated, the opening 81 is connected to the exhaust 77. Thus normally the cylinder 49 is connected to the exhaust 77 through a pipe 63. At the operator's will it receives compressed air from line 69.

In operation, the control valve 19 at the end of the hose 17 is grasped and withdrawn. This causes the hose 17 to be withdrawn through the guide 13 and unreels it from the reel 29, 33, while rotating the reel. This rotates the pinion 27 and causes the sector gear 39 to rotate counterclockwise (compare Figs. 1 and 3). This drives the piston 47 downward, exhausting air through line 63 and the exhaust 77. To withdrawing of the hose there is little resistance.

After delivery of, say, lubricant, has been made through the control valve 19 the operator presses upon the knob 76 with his hand (Fig. 4) thus closing the exhaust port 77 and permitting air to flow from the pipe 69 to the cylinder 49. This sends the apparatus from the position shown in Fig. 3 back to the position shown in Fig. 1 and reels up the hose as shown in Fig. 1.

One advantage of the linkage used is that the effective lever arm of the rod 45 in driving the sector wheel 39 is greater at the beginning of a rewinding operation (Fig. 3) than at the end (Fig. 1). This is as desired so that the reeling action does not end with a snap, but gradually slows down.

Another advantage is that the crank pin 43 may be reset at will by the user into various holes 41. For example, the crank pin 43 is in the present example a threaded stud which is threaded into any one of the threaded holes 41. Thus the stiffer the hose is, that is, the larger and thicker its walls, or the stiffer the material being conveyed, the farther out is the pin 43 set into series of holes 41. Being set into the outermost position in the drawings, the device is therefore adjusted in the present example for maximum stiffness of hose, as for example a large, heavy-walled, high-pressure lubricating hose carrying a heavy grease. For a light air hose, connection would be made say in the innermost hole 41.

While the innermost connections of the crank pin 43 and the holes 41 result in a shortening of the stroke of the piston 47, this is satisfactory, because the stroke is shortened from both ends in the cylinder 49. Hence if the cylinder 49 is designed for the maximum condition shown, it is stisfactory (long enough) for all other conditions.

No cross head guides are required between the rod 45 and the cylinder 49, in view of the oscillating character of the cylinder.

The sector form of the gear 39 saves a substantial amount of head room. The construction also saves pit room. It is also quite narrow laterally considered.

It will be seen that reconnection of the crank pin 43 at various radii increases the mechanical advantage between the air cylinder 49 and the reel throughout an entire stroke as the radii are increased. This ability to change the mechanical advantage throughout the action of the linkage is in addition to the reduction in mechanical advantage which occurs as the reeling action proceeds in a given stroke.

Figure 5:
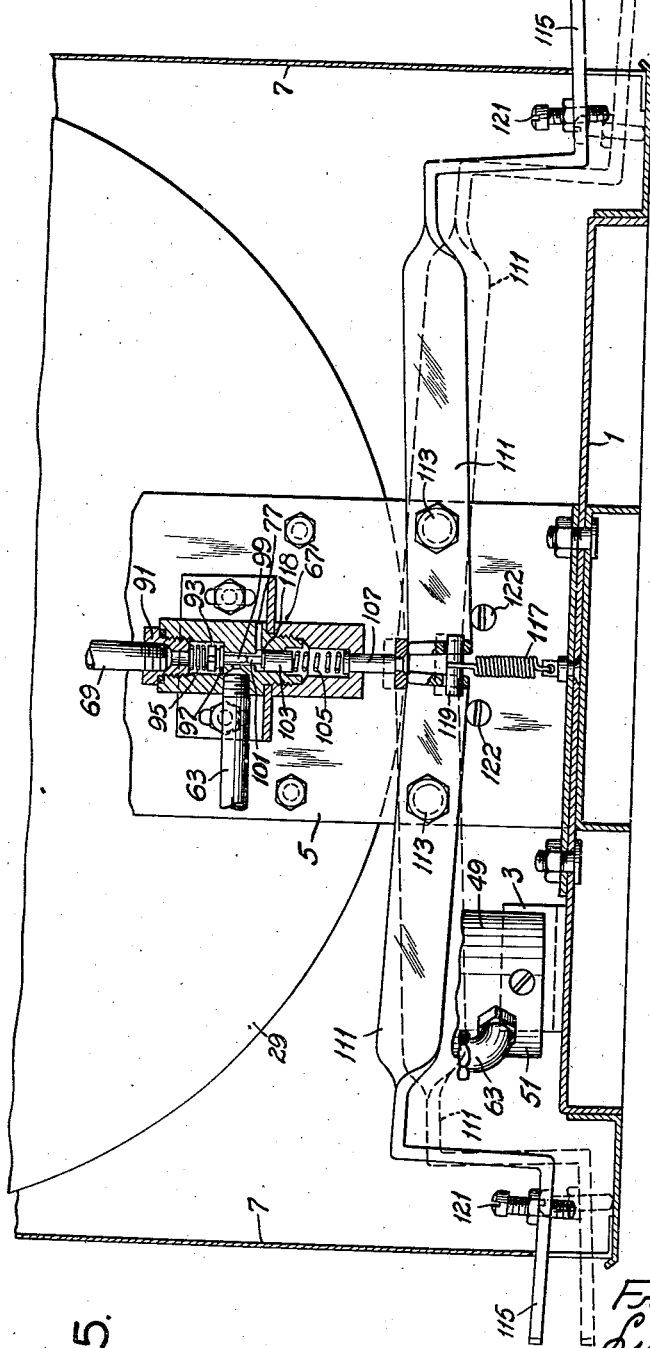
Fig. 5 is a fragmentary detail showing an alternative form of valve.

In Fig. 5 is shown an alternative in which the valve 67 is made as a foot valve, like numerals designating like parts. In this case, the control valve 67' is placed at the bottom of plate 5 and has the connection for line 69 at 91. Its valve head 93 is pressed to a seat on a gasket 97 by means of a spring 95. The stem 99 of the valve 93 is contacted by the stem 101 of a plug 103 backed by a normally completely extended spring 105 when the plug 103 is in the position shown, that is, with exhaust port 77 open. A stem 107, when lifted, causes seating of the plug 103 through the relatively stiff spring 105 to close the exhaust port 77 when valve 93 opens.

Bars 111 are pivoted at 113 and have foot control portions 115. A spring 117, acting through a cross bar 119, serves to pull either (or both) levers 111 to valve-closing position of 93. In order to operate the valve, an operator presses his foot on either pedal 115 thus raising the member 107 to push down the plug 103 to a seat on its gasket 118. This is done through the spring 105 which when the valve is opened is normally fully expanded, or which may be made weaker when extended than spring 95, and stronger when compressed the requisite amount. The purpose of the spring 105 is to permit ample tolerances in the construction of the foot valve operating parts, and to prevent the load of a man from being applied to the small seating area of the plug 103. When the plug 103 seats, the valve 93 opens, thus permitting air to flow from pipe 69 to pipe 63 and the cylinder 49. Adjustable stop screws 121 serve to limit the downward movement of the pedals 115, and consequently the upward movement of the member 107. Stops 122 limit upward pedal movements. When a foot is taken off of a pedal 115, the spring 117 returns the respective lever and the air pressure in addition to pressure of spring 95 closes the valve 93 (provided the other pedal 115 is up) while the plug 103 normally drops away from its seat to effect exhaust of cylinder 49 through 63 and 77.

It will be understood that the supply pipe 69 leads to a suitable air reservoir, as an air tank, such as is available at most garages. Ordinarily, such reservoirs are maintained by an unloader or the like at a desirable pressure. If the pressure in such a reservoir is too high, a regulating valve may be inserted between the reservoir and the valve 67.

Another way to connect the apparatus is to omit connection through the valve 67 and make connection directly from the air tank to the inlet 61 of the cylinder 49. Thus air-tank pressure would normally send the apparatus into the reeled position shown in Fig. 1, and upon unreeling, the piston 47 would simply be driven against the pressure of the air tank. The relatively great volume of the air in the tank, as compared to the volume in cylinder 49, would prevent the pressure from building up substantially above that of the tank. Then upon the operator releasing the end of the hose 17, the hose would be automatically reeled up.

If, with this last-suggested connection, a regulating valve is needed between the supply tank and the cylinder 49, the problem is encountered that the regulating valve will not permit return flow of air to the tank upon compression in the cylinder 49. Under such circumstances, a suitable volume of air would need to be provided between the regulating valve and the cylinder 49, as by making a section of the piping large enough to prevent undesirable rise in pressure upon compression in the cylinder 49. Since these alternative connections constitute no part of the invention per se, they have not been illustrated. They are given simply for completeness.

In Figs. 6, 7 and 8 is shown a form of the invention in which, after substantial unreeling of the hose (or its nearly complete withdrawal from the reel), the control valve is automatically set to supply air for pulling in the hose when the latter is released at maximum extension. Provision is also made for resetting the valve to exhaust position after the hose has been wound.

In Figs. 6, 7 and 8 like numerals designate like parts. The additional features consist in a plate 127 fastened to the hub of the sector gear 39. The plate 127 carries a cam 129.

Above the plate 127 and in the plane of the cam is the valve 131 having a stem 133 with grooves 135 (for details see Fig. 8). Spring-pressed detents 137 permit the stem 133 to be held in either an up or down position. Stem 133 is grooved at 139 so that when the stem is up a connection is made between the air inlet 69 and the supply line 63. The latter leads to the inlet port 61 of the cylinder 49. Thus, when the valve stem 133 is up, the groove 139 makes a connection between the air supply and the cylinder 49. This condition is shown in Figs. 6, 7 and 8 wherein the mechanism is in the unreeled position.

When the stem is down, connection is cut off and a communication is established between the pipe 63 and the exhaust port 77.

Operation of the form of Figs. 6, 7 and 8 is as follows:

When the hose is reeled up, the cam is to the right (clockwise) of its position shown in Fig 6, and the valve stem 133 is presumed to be down. This presumption arises from the fact that the stem 133 has an extension 141 including a button 143 which, after the previous winding-up of a hose, has been pushed down so that port 139 connects 63 with 77.

Upon unreeling of the hose, exhaust occurs from 63 to 77. After the hose has been drawn out (under tension), cam 129 contacts the lower end of the stem 133 and forces it into the position shown in Fig. 6, wherein the supply pipe 69 is connected with pipe 63, thus causing inlet of air to cylinder 49 for reeling (see also Fig. 8).

It will be noted that after reeling starts the valve stem 133 retains its elevated position because of the action of detents 137 in the lowermost of the grooves 135. Thus, if an operator chooses not to push down the button 143, he can draw out the hose against air compression in the cylinder 49 and obtain an automatic reaction, although this is not the preferred operation. The preferred operation is for the operator to press down on the button 143 prior to withdrawing the hose.

Another mode of operation is for the operator to raise the button 143 after the hose has been partially pulled out and before the cam 129 lifts the stem 133, thus obtaining a reeling-up for any length of hose withdrawn and prior to complete withdrawal. Furthermore, the cam 129 may be set to operate at any desired length of hose withdrawal.

The advantage of the form of the invention of Figs. 6 and 7 is that valve operation is performed when the operator is near the reel anyway for the purpose of grasping the end of the hose preparatory to unreeling.

Another feature shown in Figs. 6 and 7, that may be used in the other forms of the invention, is a cover 145 fastened to the standard 5 and surrounding the lower portions of the reel so that in no event can loose loops of hose find their way out from between the plates 29 and 33. On the forward edge of the cover 145 is a support for a guide roller 147.

It will be understood that the valve of Figs. 6 and 7 may also be foot-controlled by suitable adaptations.

Figure 9:
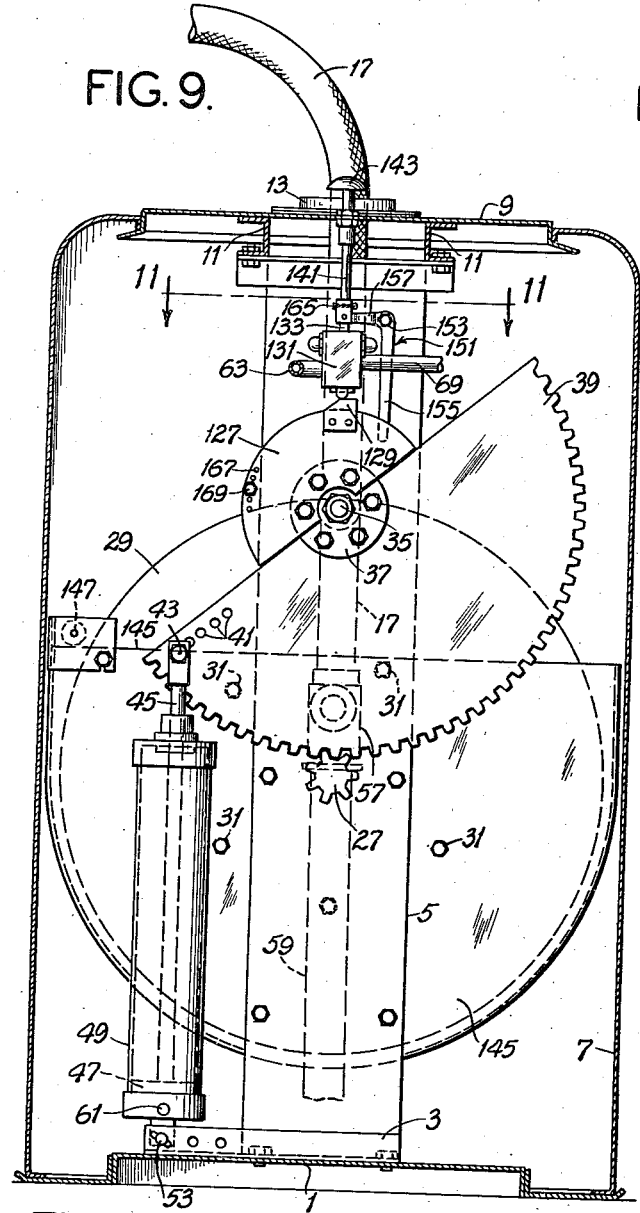
Fig. 9 is a fragmentary detail elevation of a modification.
Figure 10:
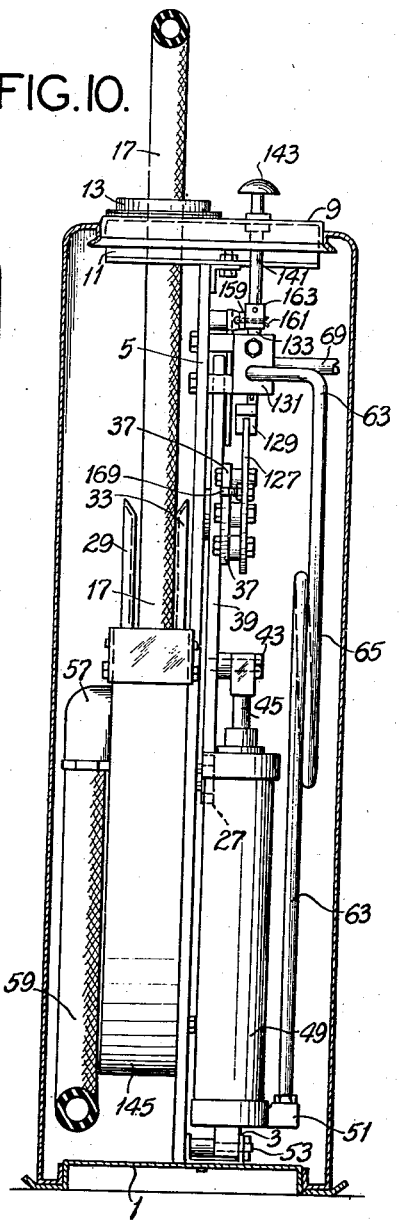
Fig. 10 is a left side elevation of Fig. 9.
Figure 11:
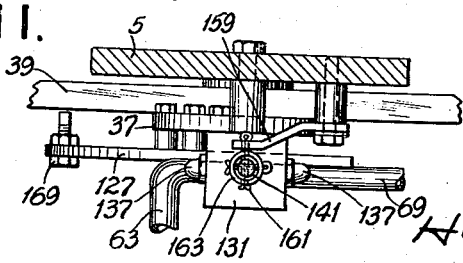
Fig. 11 is a horizontal section taken on line 11—11 of Fig. 10.

In Figs. 9-11 is shown an alternative by means of which the valve 131 is automatically reset (depressed) to exhaust position. Like numerals designate like parts.

In this case a bell crank 151 is pivoted at 153. This bell crank has a downward arm 155 and a horizontal arm 157. The latter includes a connection 159 by means of a cotter key 161 with the sleeve 163 which joins stems 141 and 133. From Fig. 9 it will be seen that a second cotter key 165 joins the sleeve 163 with the upper stem 131, and that the lower cotter key 161 joins the sleeve with the lower stem 133 and that said lower cotter key also makes the stated connection with the arm 157.

On the cam-carrying plate 127 is arranged a series of holes 167 for receiving in one hole or another a trip finger 169 which, when the hose has been completely rewound, contacts the arm 155 of the bell crank 151. This causes counter-clockwise action (Fig. 9) of the bell crank and downward movement of the valve stem 133 to its exhaust position. Thus an automatic reset is obtained whereby the hose may be pulled out freely without action against compressed air. By having the trip finger 169 adjustable in any one of these various holes 167, the action may be coordinated as desired. After the line 17 has been withdrawn from the reel, the cam 129 first sets the valve 131 to deliver air to effect rewinding of the line. As the line is rewound, the valve 131 is again set to release position, so that upon the next withdrawal there is no resistance from the pneumatic means.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. Reeling apparatus comprising a reel for reeling a line, a frame supporting the reel, an operating power cylinder, an operating linkage between the cylinder and reel for delivering power from the cylinder to the reel, said linkage having a decreasing mechanical advantage between the cylinder and the reel as reeling occurs.

2. Reeling apparatus comprising a reel for reeling a line, a frame supporting the reel, an operating power cylinder, an operating linkage between the cylinder and reel for delivering power from the cylinder to the reel, said linkage having a decreasing mechanical advantage between the cylinder and the reel as reeling occurs, and means for reconnecting parts of the linkage at will to change the value of said mechanical advantage throughout the action of the linkage.

3. Reeling apparatus comprising a reel for reeling a line, a frame supporting the reel, an operating cylinder, a piston therein, an operating linkage between the piston and the reel, a valve having a cylinder connection and an inlet, and means operative upon tensioning of the line only after a nearly complete withdrawal from the reel to set the valve to connect the inlet with the cylinder connection.

4. Reeling apparatus comprising a reel for reeling a line, a frame supporting the reel, an operating cylinder, a piston therein, an operating linkage between the cylinder and the reel, a valve having a cylinder connection and an inlet and an exhaust, means operative upon tensioning of the line only after a nearly complete withdrawal from the reel to set the valve to connect the inlet with the cylinder connection, and detent means for holding said valve in said connecting position while the line is being reeled up.

5. Reeling apparatus comprising a reel for reeling a line, a frame supporting the reel, an operating cylinder, a piston therein, an operating linkage between the cylinder and the reel, a valve having a cylinder connection and an inlet and an exhaust, a cam operative upon withdrawal of the line to set the valve to connect the inlet with the cylinder connection, detent means for holding said valve in said connecting position while the line is being reeled up, and manual means for resetting the valve after the line is reeled to connect said cylinder connection to exhaust and in position to be operated by the cam.

6. Reeling apparatus comprising a reel for reeling a line, a frame supporting the reel, pneumatic means, an operating linkage between the pneumatic means and the reel, a line supplying air to the pneumatic means, a valve in said line, means whereby when the line is withdrawn said valve is automatically set to deliver air to the pneumatic means to cause said pneumatic means to move the reel to rewind the line, and a second means adapted automatically to set said valve to release the air from the pneumatic means when the line is rewound.

7. Reeling apparatus comprising a reel for reeling a line, a frame for supporting the reel, an operating air cylinder, an operaitng linkage between the cylinder and the reel, said linkage including a piston, an air valve connected with the cylinder to transmit air thereto when the valve is open and to release air therefrom when the valve is closed, a valve-operating stem in the air valve setting the valve to open or closed positions alternatively, means movable with the linkage and operable upon substantially complete withdrawal of the line from the reel to contact said stem to open the valve, and a second means movable with the linkage and adapted to set the stem to closed releasing position upon substantially complete reeling in of the line.

8. Reeling apparatus comprising a reel for reeling a line, a frame for supporting the reel, an operating air cylinder, an operating linkage between the cylinder and the reel, said linkage including a piston, an air valve connected with the cylinder to transmit air thereto when the valve is open and to release air therefrom when the valve is closed, a valve-operating stem in the air valve for setting the valve to open and closed positions alternatively, means movable with the linkage and operable upon substantially complete withdrawal of the line from the reel to contact said stem to open the valve, a second means movable with the linkage and adapted to set the stem to closed releasing position upon substantially complete reeling in of the line, and manually operable means adapted upon operation to open the valve for reeling the line in from any point of withdrawal.

9. Reeling apparatus comprising a reel for reeling a line, a frame for supporting the reel, an operating air cylinder, an operating linkage between the cylinder and the reel, said linkage including a piston, an air valve connected with the cylinder to transmit air thereto when the valve is open and to release air therefrom when the valve is closed, a valve-operating stem in the air valve for setting the valve to open and closed positions alternatively, detent means for holding the stem in either an open position or a closed releasing position, manual means for setting the stem to its open position, and means movable with the linkage and operable upon substantially complete withdrawal of the line from the reel to contact said stem to set it to open position.

10. Reeling apparatus comprising a reel for reeling a line, a frame for supporting the reel, an operating air cylinder, an operating linkage between the cylinder and the reel, said linkage including a piston, an air valve connected with the cylinder to transmit air thereto when the valve is open and to release air therefrom when the valve is closed, a valve-operating stem in the air valve for setting the valve to open and release positions alternatively, detent means for holding the stem in either open position or in closed releasing position, manual means for setting the stem to its open position, and means movable with the linkage and operable upon substantially complete reeling of the line on the reel to contact said stem to set it to closed release position.

FRANK S. BARKS.
LUTWIN C. ROTTER.
VICTOR G. KLEIN.